(12) United States Patent
Bendall

(10) Patent No.: US 8,213,676 B2
(45) Date of Patent: Jul. 3, 2012

(54) INSPECTION APPARATUS METHOD AND APPARATUS COMPRISING MOTION RESPONSIVE CONTROL

(75) Inventor: Clark A. Bendall, Syracuse, NY (US)

(73) Assignee: GE Inspection Technologies LP, Schenectady, NY (US)

( * ) Notice: Subject to any disclaimer, the term of this patent is extended or adjusted under 35 U.S.C. 154(b) by 1185 days.

(21) Appl. No.: 11/642,344

(22) Filed: Dec. 20, 2006

(65) Prior Publication Data

US 2008/0152210 A1    Jun. 26, 2008

(51) Int. Cl.
*G06K 9/00* (2006.01)

(52) U.S. Cl. ......................................................... 382/103

(58) Field of Classification Search ........... 382/254–275
See application file for complete search history.

(56) References Cited

U.S. PATENT DOCUMENTS

| | | |
|---|---|---|
| 2,929,866 A | 3/1960 | Melamed |
| 3,188,386 A | 6/1965 | Byatt |
| 3,493,748 A | 2/1970 | Tajima |
| 3,515,800 A | 6/1970 | Ebihara et al. |
| 3,623,126 A | 11/1971 | Newhouse |
| 3,783,190 A | 1/1974 | Gaebele |
| 3,845,242 A | 10/1974 | Richeson, Jr. et al. |
| 3,934,081 A | 1/1976 | Schumacher |
| 3,980,819 A | 9/1976 | Schwartz |
| 4,115,804 A | 9/1978 | Morton et al. |
| 4,354,749 A | 10/1982 | Hosoda |
| 4,410,914 A | 10/1983 | Siau |
| 4,433,346 A | 2/1984 | Stoffel et al. |
| 4,442,452 A | 4/1984 | Kurata et al. |
| 4,476,494 A | 10/1984 | Tugaye et al. |
| 4,491,865 A | 1/1985 | Danna et al. |
| 4,516,153 A | 5/1985 | Krull et al. |
| 4,546,381 A | 10/1985 | Kurata et al. |
| 4,547,809 A | 10/1985 | Southgate |
| 4,608,606 A | 8/1986 | Levine |
| 4,622,954 A | 11/1986 | Arakawa et al. |
| 4,646,723 A | 3/1987 | Arakawa |
| 4,658,956 A | 4/1987 | Takeda et al. |
| 4,668,978 A | 5/1987 | Gokita |
| 4,682,219 A | 7/1987 | Arakawa |
| 4,692,608 A | 9/1987 | Cooper et al. |
| 4,695,878 A | 9/1987 | Levine et al. |
| 4,700,693 A | 10/1987 | Lia et al. |
| 4,706,654 A | 11/1987 | Ogiu et al. |
| 4,720,178 A | 1/1988 | Nishioka et al. |

(Continued)

FOREIGN PATENT DOCUMENTS

| | | |
|---|---|---|
| JP | 59215772 A | 12/1984 |
| JP | 63292119 A | 11/1988 |
| JP | 11249031 A | 9/1999 |
| JP | 2000107120 A | 4/2000 |
| JP | 2001095757 A | 4/2001 |

OTHER PUBLICATIONS

U.S. Appl. No. 60/786,829, filed Mar. 27, 2006, Lambdin et al. U.S. Appl. No. 11/642,569, filed Dec. 20, 2006, Bendall.

*Primary Examiner* — Alex Liew

(74) *Attorney, Agent, or Firm* — GE Global Patent Operation; Mark A. Conklin

(57) ABSTRACT

An inspection apparatus can process image data of one or more frames. In one aspect processing of image data can include processing for determination of a motion parameter. In one aspect an inspection apparatus can be controlled responsively to the processing of image data for determination of a motion parameter.

13 Claims, 8 Drawing Sheets

U.S. PATENT DOCUMENTS

| | | | |
|---|---|---|---|
| 4,727,859 A | 3/1988 | Lia | |
| 4,733,937 A | 3/1988 | Lia et al. | |
| 4,735,501 A | 4/1988 | Ginsburgh et al. | |
| 4,741,327 A | 5/1988 | Yabe | |
| 4,745,470 A | 5/1988 | Yabe et al. | |
| 4,745,471 A | 5/1988 | Takamura et al. | |
| 4,747,327 A | 5/1988 | Itoh et al. | |
| 4,754,332 A * | 6/1988 | Bergquist | 348/576 |
| 4,757,805 A | 7/1988 | Yabe | |
| 4,758,891 A | 7/1988 | Hitchcock et al. | |
| 4,777,385 A | 10/1988 | Hartmeier | |
| 4,777,524 A | 10/1988 | Nakajima et al. | |
| 4,779,130 A | 10/1988 | Yabe | |
| 4,786,965 A | 11/1988 | Yabe | |
| 4,787,369 A | 11/1988 | Allred, III et al. | |
| 4,790,294 A | 12/1988 | Allred, III et al. | |
| 4,794,912 A | 1/1989 | Lia | |
| 4,796,607 A | 1/1989 | Allred, III et al. | |
| 4,807,026 A | 2/1989 | Nishioka et al. | |
| 4,809,680 A | 3/1989 | Yabe | |
| 4,862,253 A | 8/1989 | English et al. | |
| 4,868,644 A | 9/1989 | Yabe et al. | |
| 4,868,646 A | 9/1989 | Tsuji | |
| 4,873,572 A | 10/1989 | Miyazaki et al. | |
| 4,887,154 A | 12/1989 | Wawro et al. | |
| 4,890,159 A | 12/1989 | Ogiu | |
| 4,895,431 A | 1/1990 | Tsujiuchi et al. | |
| 4,901,143 A | 2/1990 | Uehara et al. | |
| 4,909,600 A | 3/1990 | Ciarlei et al. | |
| 4,913,369 A | 4/1990 | Lia et al. | |
| 4,918,521 A | 4/1990 | Yabe et al. | |
| 4,933,757 A | 6/1990 | Kanno et al. | |
| 4,941,454 A | 7/1990 | Wood et al. | |
| 4,941,456 A | 7/1990 | Wood et al. | |
| 4,962,751 A | 10/1990 | Krauter | |
| 4,969,034 A | 11/1990 | Salvati | |
| 4,979,035 A | 12/1990 | Uehara et al. | |
| 4,980,763 A | 12/1990 | Lia | |
| 4,989,581 A | 2/1991 | Tamburrino et al. | |
| 4,993,405 A | 2/1991 | Takamura et al. | |
| 4,998,182 A | 3/1991 | Krauter et al. | |
| 4,998,971 A | 3/1991 | Fukunishi | |
| 5,014,515 A | 5/1991 | Krauter | |
| 5,014,600 A | 5/1991 | Krauter et al. | |
| 5,018,436 A | 5/1991 | Evangelista et al. | |
| 5,018,506 A | 5/1991 | Danna et al. | |
| 5,019,121 A | 5/1991 | Krauter | |
| 5,021,888 A | 6/1991 | Kondou et al. | |
| 5,023,570 A | 6/1991 | Matsumoto | |
| 5,032,913 A | 7/1991 | Hattori et al. | |
| 5,034,888 A | 7/1991 | Uehara et al. | |
| 5,047,848 A | 9/1991 | Krauter | |
| 5,052,803 A | 10/1991 | Krauter | |
| 5,061,995 A | 10/1991 | Lia et al. | |
| 5,066,122 A | 11/1991 | Krauter | |
| 5,070,401 A | 12/1991 | Salvati et al. | |
| 5,114,636 A | 5/1992 | Evangelista et al. | |
| 5,140,975 A | 8/1992 | Krauter | |
| 5,155,585 A | 10/1992 | Ishikawa | |
| 5,164,824 A | 11/1992 | Ieoka et al. | |
| 5,191,879 A | 3/1993 | Krauter | |
| 5,202,758 A | 4/1993 | Tamburrino | |
| 5,203,319 A | 4/1993 | Danna et al. | |
| 5,220,198 A | 6/1993 | Tsuji | |
| 5,270,810 A | 12/1993 | Nishimura et al. | |
| 5,275,152 A | 1/1994 | Krauter et al. | |
| 5,278,642 A | 1/1994 | Danna et al. | |
| 5,278,656 A | 1/1994 | Hynecek et al. | |
| 5,291,151 A | 3/1994 | Fujiwara et al. | |
| 5,305,098 A | 4/1994 | Matsunaka et al. | |
| 5,314,070 A | 5/1994 | Ciarlei | |
| 5,323,899 A | 6/1994 | Strom et al. | |
| 5,345,339 A | 9/1994 | Knieriem et al. | |
| 5,347,989 A | 9/1994 | Monroe et al. | |
| 5,365,331 A | 11/1994 | Tamburrino et al. | |
| 5,369,446 A | 11/1994 | Parker et al. | |
| 5,373,317 A | 12/1994 | Salvati et al. | |
| 5,377,669 A | 1/1995 | Schulz | |
| 5,387,928 A * | 2/1995 | Nishimura | 348/70 |
| D358,471 S | 5/1995 | Cope et al. | |
| 5,418,566 A | 5/1995 | Kameishi | |
| 5,420,644 A | 5/1995 | Watanabe et al. | |
| 5,435,296 A | 7/1995 | Vivenzio et al. | |
| 5,441,043 A | 8/1995 | Wood et al. | |
| 5,469,210 A | 11/1995 | Noguchi et al. | |
| 5,515,449 A * | 5/1996 | Tsuruoka et al. | 382/128 |
| 5,568,190 A | 10/1996 | Noguchi et al. | |
| 5,587,736 A | 12/1996 | Walls | |
| 5,614,943 A | 3/1997 | Nakamura et al. | |
| 5,617,136 A | 4/1997 | Iso et al. | |
| 5,631,695 A | 5/1997 | Nakamura et al. | |
| 5,633,675 A | 5/1997 | Danna et al. | |
| 5,667,474 A * | 9/1997 | Nishimura | 600/109 |
| 5,675,378 A | 10/1997 | Takasugi et al. | |
| 5,694,530 A | 12/1997 | Goto | |
| 5,696,850 A | 12/1997 | Parulski et al. | |
| 5,701,155 A | 12/1997 | Wood et al. | |
| 5,730,129 A | 3/1998 | Darrow et al. | |
| 5,733,246 A | 3/1998 | Forkey | |
| 5,734,418 A | 3/1998 | Danna | |
| 5,749,362 A | 5/1998 | Funda et al. | |
| 5,749,827 A | 5/1998 | Minami | |
| 5,754,313 A | 5/1998 | Pelchy et al. | |
| 5,764,809 A | 6/1998 | Nomami et al. | |
| 5,776,049 A | 7/1998 | Takahashi | |
| 5,779,625 A | 7/1998 | Suzuki et al. | |
| 5,788,628 A | 8/1998 | Matsuno et al. | |
| 5,796,427 A | 8/1998 | Suzuki et al. | |
| 5,821,532 A | 10/1998 | Beaman et al. | |
| 5,823,958 A | 10/1998 | Truppe | |
| 5,840,014 A | 11/1998 | Miyano | |
| 5,857,963 A | 1/1999 | Pelchy et al. | |
| 5,860,912 A | 1/1999 | Chiba | |
| 5,877,803 A | 3/1999 | Wee et al. | |
| 5,883,610 A | 3/1999 | Jeon | |
| 5,921,931 A * | 7/1999 | O'Donnell et al. | 600/441 |
| 5,946,034 A | 8/1999 | Cortiula | |
| 5,951,464 A | 9/1999 | Takahashi et al. | |
| 5,953,013 A | 9/1999 | Shimizu | |
| 5,956,416 A | 9/1999 | Tsuruoka et al. | |
| 5,964,696 A | 10/1999 | Mihalca et al. | |
| 5,983,120 A | 11/1999 | Groner et al. | |
| 5,990,471 A | 11/1999 | Watanabe et al. | |
| 6,002,430 A | 12/1999 | McCall et al. | |
| 6,008,939 A | 12/1999 | Hebert | |
| 6,075,555 A | 6/2000 | Street | |
| 6,083,152 A | 7/2000 | Strong | |
| 6,084,461 A | 7/2000 | Colbeth et al. | |
| 6,088,612 A | 7/2000 | Blair | |
| 6,097,848 A | 8/2000 | Salvati | |
| 6,108,005 A | 8/2000 | Starks et al. | |
| 6,120,435 A | 9/2000 | Eino et al. | |
| 6,172,361 B1 | 1/2001 | Holberg et al. | |
| 6,184,514 B1 | 2/2001 | Rezende et al. | |
| 6,191,809 B1 | 2/2001 | Hori et al. | |
| 6,211,904 B1 | 4/2001 | Adair et al. | |
| 6,266,430 B1 | 7/2001 | Rhoads | |
| 6,310,647 B1 | 10/2001 | Parulski et al. | |
| 6,313,456 B1 | 11/2001 | Miyashita et al. | |
| 6,373,523 B1 | 4/2002 | Jang | |
| 6,428,650 B1 | 8/2002 | Chung | |
| 6,461,298 B1 | 10/2002 | Fenster et al. | |
| 6,468,201 B1 | 10/2002 | Burdick | |
| 6,472,247 B1 | 10/2002 | Andoh et al. | |
| 6,483,535 B1 | 11/2002 | Tamburrino et al. | |
| 6,494,739 B1 | 12/2002 | Vivenzio et al. | |
| 6,538,732 B1 | 3/2003 | Drost et al. | |
| 6,547,721 B1 | 4/2003 | Higuma et al. | |
| 6,590,470 B1 | 7/2003 | Burdick | |
| 6,830,545 B2 | 12/2004 | Bendall | |
| 6,953,432 B2 | 10/2005 | Schiefer | |
| 7,134,993 B2 | 11/2006 | Lia et al. | |
| 2001/0042825 A1 | 11/2001 | Young | |
| 2003/0067544 A1 | 4/2003 | Wada | |

| | | |
|---|---|---|
| 2004/0183900 A1 | 9/2004 | Karpen et al. |
| 2004/0215413 A1 | 10/2004 | Weldum et al. |
| 2005/0050707 A1 | 3/2005 | Scott et al. |
| 2005/0129108 A1 | 6/2005 | Bendall et al. |
| 2005/0162643 A1 | 7/2005 | Karpen |
| 2005/0281520 A1 | 12/2005 | Kehoskie et al. |
| 2006/0050983 A1 | 3/2006 | Bendall et al. |
| 2006/0072903 A1 | 4/2006 | Weldum et al. |
| 2006/0256192 A1 | 11/2006 | Iketani et al. |

\* cited by examiner

INSPECTION APPARATUS METHOD AND APPARATUS COMPRISING MOTION RESPONSIVE CONTROL

CROSS REFERENCE TO RELATED APPLICATIONS

This application is related to U.S. patent application Ser. No. 11/642,569 filed Dec. 20, 2006 entitled, "Inspection Apparatus Method And Apparatus Comprising Selective Frame Output." The above application is incorporated herein by reference in its entirety.

FIELD OF THE INVENTION

The invention relates to an inspection apparatus in general and in particular to a visual inspection apparatus.

BACKGROUND OF THE PRIOR ART

The providing of high quality image data for visual display is critical to the operation of inspection apparatuses, such as industrial inspection apparatus.

Industrial inspection apparatus are often utilized in a variety of high heat, cold or other stressful working environment, which affect the quality of generated image signals. The quality of image signals is affected by the use of such apparatuses. Inspection apparatuses often are moved quickly into and out of areas to be inspected. The amount of received light received at an inspection apparatus image sensor (often detected as the "brightness" of a captured image) and other operating conditions often vary during periods of such movement.

In many inspection applications, the only light illuminating the area being inspected is light that is emitted by the inspection apparatus. With the inspection apparatus being small, such as in a visual inspection apparatus having an elongated inspection tube, there is a limited amount of light that can be delivered. Small apertures can be incorporated in such devices for achieving a reasonable depth of field. However, the smaller the aperture that is employed, less light can reach an image sensor. Without substantial light reading an image sensor, captured frames of image data captured by an inspection apparatus exhibit a low signal-to-noise ratio.

To compensate for variations in received light varying as a result of movement of an inspection apparatus, imaging parameters related to the operation of the image sensor and the processing of its output signal, such as gain and exposure period can be adjusted. Gain applied to the output signal of an image sensor has been observed to result in production of noisy image signals. When an exposure period is increased to compensate for a reduction in received light, problems of image blur have been noted.

DETAILED DESCRIPTION

There is described an inspection apparatus which can process image data of one or more frames of image data for determination of a motion parameter. In one aspect an inspection apparatus can be controlled responsively to the processing of image data for determination of a motion parameter.

In one embodiment, an inspection apparatus can be configured to process image data of one or more frames to determine a motion parameter and can further be configured to process a plurality of frames to determine a noise reduced frame of image data. An inspection apparatus can further be configured so that responsively to the processing of image data for determination of at least one motion parameter, the apparatus can selectively output the noise reduced frame to a display. In a further aspect, the inspection apparatus can output a series of noise reduced frames to a display in the formation of a displayed video image. An inspection apparatus can be configured to selectively output a noise reduced frame on the condition that a stopped condition is detected. A technical effect of a described embodiment is to enhance a quality of displayed frames of image data.

Figure 1:
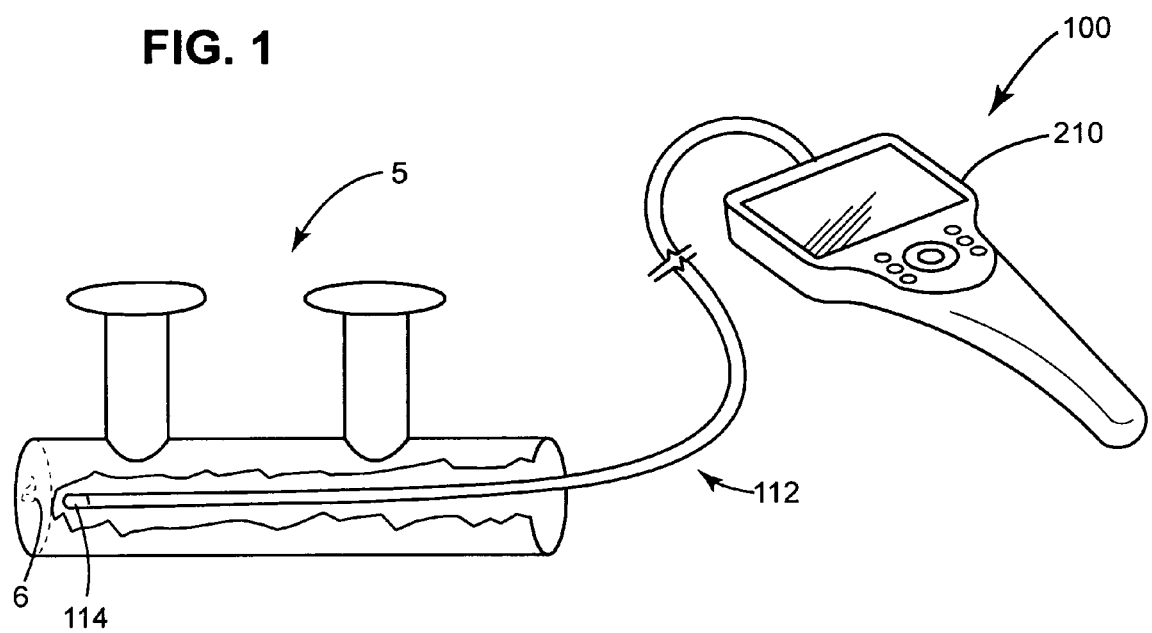
FIG. 1 is a physical form view showing an inspection apparatus in use performing an inspection.

In FIG. 1 there is shown inspection apparatus 100 in use for inspection of workpiece 5. In the example illustrated, inspection apparatus 100 is characterized by display 210 and an elongated inspection tube 112 having a head assembly 114 disposed at a distal end thereof. In the example illustrated, workpiece 5 is an industrial equipment article in the form of a piping assembly. In use, head assembly 114 of elongated inspection tube 112 can be inserted into workpiece 5 and moved into a position proximate an area of interest 6 so that a field of view of apparatus 100 corresponds to the interest area. From the time head assembly 114 is inserted into workpiece 5 to the time that it is moved into a position proximate area of interest 6, inspection apparatus 100, and particularly head assembly 114 will generally be in motion as head assembly 114 is moved into a destination position. However, when head assembly 114 approaches a position proximate area of interest 6, inspection apparatus 100 can be stopped several times as an inspector first determines whether the field of view corresponds to area of interest and then after a destination position has been achieved, the inspector observes the frame image data displayed on display 210. Inspection apparatus 100 can be configured (adapted) to continuously display frames of image data corresponding to the present field of view on display 210 and an inspector can observe the displayed frame of image data for performance of an inspection.

Based on the observation that an inspection apparatus is generally controlled to be in motion when spaced apart from an area of interest to be subject to inspection and is generally controlled to be stopped when proximate or at an area of interest (when a field of view of the apparatus corresponds to the area of interest to be subject to inspection), the inventors determined that performance of an inspection apparatus can be enhanced by configuring (adapting) the apparatus to selectively output to a display of the apparatus a noise reduced frame. In particular, the inventors determined that performance of inspection apparatus 100 can be enhanced by configuring inspection apparatus 100 to selectively output a noise reduced frame provided by processing several single frames on display 210 on the condition that the apparatus has been stopped and to otherwise avoid displaying frame averaged noise reduced image. By displaying a frame averaged noise reduced frame of image data conditionally on the condition an apparatus had been stopped, an inspector is able to observe, at a time where a fine detail view is most advantageous, a noise reduced image in which fine details of a representation are not obscured by noise. By avoiding displaying a noise reduced frame of image data on the condition of the apparatus being in motion, image smearing (which would be produced by averaging frames when the apparatus is in motion) can be avoided.

In one embodiment described herein, an output frame of image data can have applied thereto non-uniform gain and/or non-uniform offset parameters for improving a quality of a frame of image data having a white spot. A frame of image data having such parameters applied can be a noise reduced frame provided by processing several single frames. A frame of image data having such parameters applied can be output independent of or responsively to a detection of a motion condition by apparatus 100.

Figure 2:
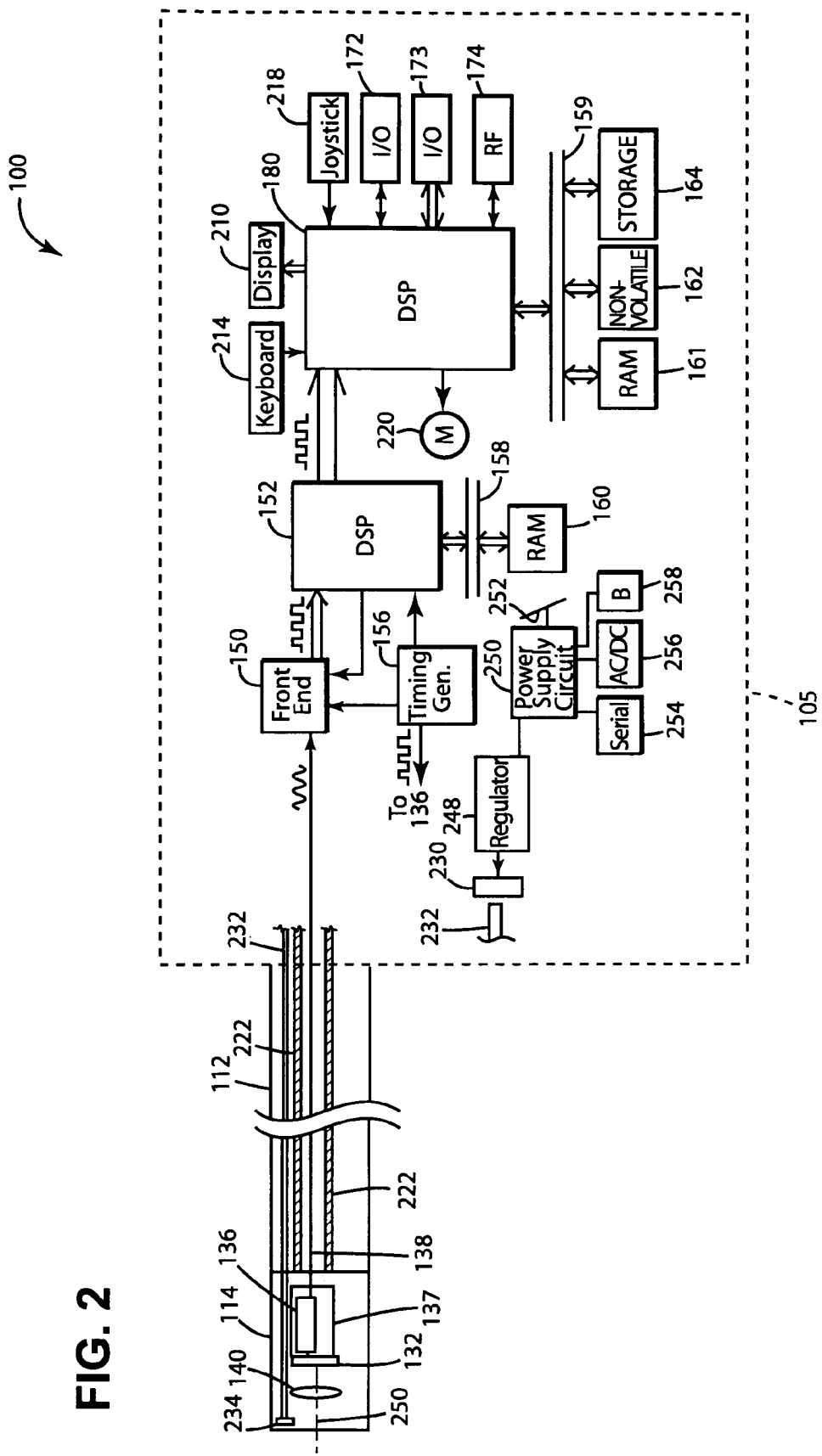
FIG. 2 is a block diagram illustrating an exemplary block diagram for an inspection apparatus.

A block diagram of an exemplary apparatus capable of supporting the above described processing is shown and described in connection with FIG. 2. Inspection apparatus 100 can include an elongated inspection tube 112 and a head assembly 114 disposed at a distal end of the elongated inspection tube. Head assembly 114 can include solid state image sensor 132 and imaging lens 140. Imaging lens 140 can focus an image onto an active surface of solid state image sensor 132. Imaging lens 140 can comprise e.g., a lens singlet or a lens having multiple components, e.g., a lens doublet, a lens triplet. Solid state image sensor 132 can be, e.g., a CCD or CMOS image sensor. Solid state image sensor 132 can include a plurality of pixels formed in a plurality of rows and columns. Solid state image sensor 132 can be provided on an integrated circuit. Image sensor 132 can generate image signals in the form of analog voltages representative of light incident on each pixel of the image sensor. Referring to further aspects of head assembly 114, image sensor 132 can be controlled so that image signals are clocked out from image sensor 132. Analog voltages representative of light incident on the various pixels of image sensor 132 can be propagated through signal conditioning circuit 136 along a cable, e.g., a coaxial cable disposed within elongated inspection tube 112. Head assembly 114 can include signal conditioning circuit 136 which conditions analog image signals for input to cable 138 and receives timing and control signals for control of image sensor 132. In one embodiment, image sensor 132 and signal conditioning circuit 136 can be mounted on a common circuit board 137. In the embodiment of FIG. 2, an imaging axis 250 of apparatus 100 extends through head assembly 114.

In the embodiment of FIG. 2, head assembly 114 of apparatus 100 at a distal end of inspection tube 112 comprises image sensor 132. An image sensor 132 of inspection apparatus 100 can, in one alternative embodiment, be located at a position spaced apart from head assembly 114, and disposed at a position rearward of a proximal end of inspection tube 112. For example, image sensor 132 can be disposed in base assembly 105 interfaced to elongated inspection tube 112 as shown in FIG. 2. An imaging system fiber optic bundle (not shown) can be disposed in elongated inspection tube 112, and can terminate in head assembly 114. The apparatus can be configured so that such a fiber optic bundle relays image forming light rays from head assembly 114 to the spaced apart image sensor spaced apart from head assembly 114.

Various circuits disposed at a position spaced apart from head assembly 114 can receive and process image signals generated by image sensor 132. In one embodiment, various circuits receiving and processing image signals generated by image sensor 132 can be disposed in base assembly 105 interfaced to elongated inspection tube 112 as shown in FIG. 2. In the exemplary embodiment of FIG. 2, analog front end circuit 150 can include an analog gain circuit, an analog-to-digital converter, and a correlated double sampler and can receive analog image signals, digitize such signals and transmit digitized image signals to digital signal processor 152 (DSP). DSP 152, in the embodiment shown, can be configured to perform such processing tasks as color matrix processing, gamma processing, and can process digital image signals into a standardized video format, wherein video signals are expressed in a standardized data format. By way of example, video signals output by DSP 152 can be in a BT656 video format and data carried in the video signal can have a 422YCRCB data format. DSP 152 can be in communication with a random access memory 160 through system bus 158. Referring to further aspects of an electrical circuit for inspection apparatus 100, apparatus 100 can include timing generator circuit 156 which can send timing and control signals to signal conditioning circuit 136 for input to image sensor 132 as well as to analog front end circuit 150 and DSP 152. As indicated by communication line labeled "to 136," timing generator circuit 156 can send control signals such as exposure timing signals frame rate timing signals to signal conditioning circuit 136 for input to image sensor 132. In one embodiment, analog circuit front end 150, DSP 152, and timing generator circuit 156 can be provided on separate integrated circuits (ICs). In one embodiment, analog front end circuit 150, DSP 152, and timing generator circuit 156 are provided as part of commercially available chips, e.g., an SS2 DSP chipset of the type available from SONY. While an analog to digital converter for converting analog image signals into digital form is described as being incorporated into front end circuit 150, such an analog to digital converter can be incorporated into an image sensor integrated circuit which commonly carries pixels of an image sensor and an analog to digital converter for digitizing analog image signals.

Referring to further aspects of apparatus 100, apparatus 100 can include DSP 180. DSP 180 can receive the formatted video output from DSP 152 for further processing. DSP 180 can be configured to perform a variety of processing tasks such as frame averaging, scaling, zoom, overlaying, merging, image capture, flipping, image enhancement, and distortion correction. DSP 180 can also be configured to perform motion detection as will be described more fully herein. In one embodiment, DSP 180 can be provided by a TMS32ODM642 Video/Imaging Fixed-Point Digital Signal Processor of the type available from TEXAS INSTRUMENTS. DSP 180 can be in communication with a volatile memory 161, e.g., a RAM, a non-volatile memory 162, and storage memory device 164. Non-volatile memory 162 can be provided e.g., by a flash memory device, an EEPROM memory device, or an EPROM memory device. Software for operating apparatus 100 can be retained in non-volatile memory 162 when apparatus 100 is not operating and such software can be loaded into RAM 161 when apparatus 100 is driven into an operating state. Apparatus 100 can include other types of storage memory. For example, a USB "thumb drive" can be plugged into serial I/O interface 172. A CompactFlash memory card can be plugged into parallel I/O interface 173. A memory of apparatus 100 can be regarded as including memory 161, 162, and 164, other storage memory, as well as internal buffer memories of DSP 152 and 180. Storage memory device 164 can be, e.g., a hard drive or removable disk. RAM 161, non-volatile memory 162, and storage device 164 can be in communication with DSP 180 via system bus 159. While DSP 152 and DSP 180 are shown as being provided on separate integrated circuits, the circuits of DSP 152 and DSP 180 could be provided on a single integrated circuit. Also, the functionalities provided by DSP 152 and DSP 180 could be provided by one or more general purpose microprocessor IC.

Apparatus 100 can be configured so that image signals are read out of image sensor 132 row by row until a frame of image signals including image signals corresponding to multiple pixels of image sensor 132 have been read out. Analog image signals read out from image sensor 132 can be converted into digital form by front end circuit 150. Front end circuit 150, in turn, can feed digitized frame image signals into DSP 152. DSP 152 can format the image signals into a specific format before feeding the digitized image signals for further processing to DSP 180. Digitized frame image signals can be referred to as frame image data.

Referring to further circuit components of the block diagram of FIG. 2, apparatus 100 can further include display 210, keyboard 214, and joystick 218. Keyboard 214 enables a user to initiate various control signals for the control of apparatus 100. Display 210 enables display of live video streaming images and other images to an inspector. For example, apparatus 100 can be controlled to switch from a live streaming video mode in which a live streaming video is being displayed on display 210 to a mode in which a still image is displayed on display 210. Apparatus 100 can be configured so that apparatus 100 can generate frame retention control signals responsively to an action by an inspector. Apparatus 100 can be configured so that an inspector can initiate a frame output control signal by actuating a designated button of keyboard 214. Frame output control signals can include, e.g., a freeze frame control signal, and a save frame control signal. Apparatus 100 can be configured so that when a freeze frame control signal is initiated, apparatus 100 can repeatedly output a buffered frame of image data buffered in a frame buffer to display 210. The frame buffer can be continuously overwritten during the course of operation of the apparatus. The frame buffer can be a buffer of RAM 161, and can be e.g., an input frame buffer, an output frame buffer, or an accumulator frame buffer. Apparatus 100 can be configured so that when a "save frame" control signal is initiated, apparatus 100 can output a buffered frame of image data buffered in a frame buffer to an addressable memory location of a memory device, e.g., RAM 161, non-volatile memory 162, and/or storage device 164. A frame of image data saved responsively to initiation of a save frame control signal can be formatted into a standardized known proprietary file format. During performance of an inspection procedure, an inspector may initiate a save frame control signal several times to save numerous frames relating to a work subject (e.g., an equipment article) being subject to an inspection. A user interface of apparatus 100 can include keyboard 214, joystick 218, and display 210.

In a further aspect, DSP 180 can be coupled to a serial I/O interface 172, e.g., an ETHERNET or USB interface and a parallel data interface, e.g., a CompactFlash interface or PCMCIA interface. DSP 180 can also be coupled to a wireless data communication interface 174, e.g., an IEEE 802.11 interface. Apparatus 100 can be configured to send frames of image data saved in a memory thereof to an external computer and can further be configured to be responsive to requests for frames of image data saved Internet protocol in a memory device of apparatus 100. Apparatus 100 can incorporate a TCP/IP, communication protocol suite and can be incorporated in a wide area network including a plurality of local and remote computers, each of the computers also incorporating a TCP/IP communication protocol suite. With incorporation of TCP/IP protocol suite, apparatus 100 incorporates several transport layer protocols including TCP and UDP and several different layer protocols including HTTP and FTP.

Referring to further aspects of apparatus 100, apparatus 100 can include joystick 218 for controlling a positioning of head assembly 114. In one embodiment, articulation cables 222 can be incorporated in elongated inspection tube 112 to enable movement of head assembly 114 into a desired position so that a field of view of apparatus 100 can be changed. Joystick 218 can be in communication with DSP 180. Apparatus 100 can be configured so that control signals for controlling movement (articulation) of head assembly 114 are initiated by manipulating joystick 218. Apparatus 100 can be configured so that when joystick 218 is moved, DSP 180 receives a control signal from joystick 218 and sends corresponding motor control signals to articulation motor 220 to produce a desired movement of head assembly 114. Apparatus 100 can also be configured so that joystick 218 operates as a pointer control for controlling a pointer displayed on display 210.

In another aspect, inspection apparatus 100 can include a light source 230, (e.g., an arc lamp or a bank of one or more LEDs), which, like circuits 150, 152, 156, and 180 can be disposed at a position spaced apart from head assembly 114. Apparatus 100 can also include an illumination fiber optic bundle 232 receiving light emitted from light source 230. Fiber optic bundle 232 can be disposed in elongated inspection tube 112 so that fiber optic bundle 232 can relay light emitted from light source 230 through inspection tube 112 and to head assembly 114. A distal end of fiber optic bundle 232 can be interfaced to diffuser 234 for diffusing illumination light. Fiber optic bundle 232 and diffuser 234 can be arranged to project light over an area approximately corresponding to a field of view of image sensor 132. In a further aspect, light source 230 can be powered by a regulator 248 coupled to a power supply circuit 250. Power supply circuit 250 can be arranged to power circuit board 252 receiving various integrated circuits of apparatus 100 as well buses 158, 159. Power supply circuit 250 can be interfaced to various alternative power sources, e.g., serial I/O power source 254, AC/DC transformer source 256, and rechargeable battery 258.

During operation to output a live streaming video image on display 210, incoming frames may be input into an input frame buffer of RAM 161, subject to processing by DSP 180 and output to an output frame buffer of RAM 161. Apparatus 100 can be configured so that when a freeze frame control signal is initiated, a frame of an output frame buffer is continually output to display 210. Apparatus 100 can also be configured so that when a save frame control signal is initiated, a frame of an input frame buffer is output to an addressable memory location of a memory device, e.g., RAM 161, non-volatile memory 162, or long term storage device 164.

Figure 3:
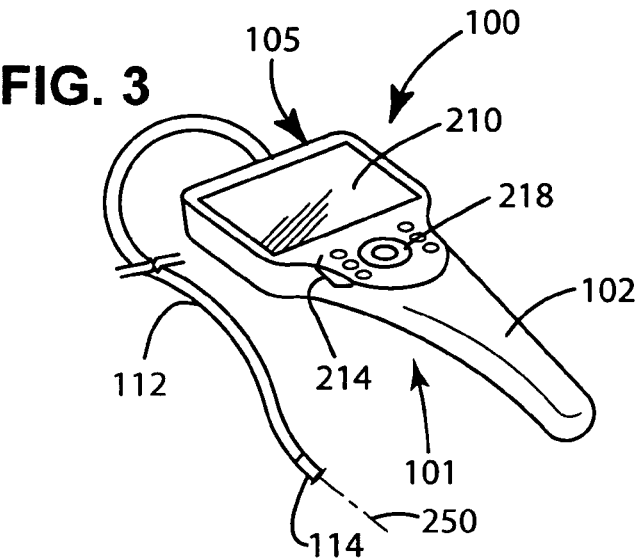
FIG. 3 is an exemplary physical form view for an inspection apparatus.
Figure 4:
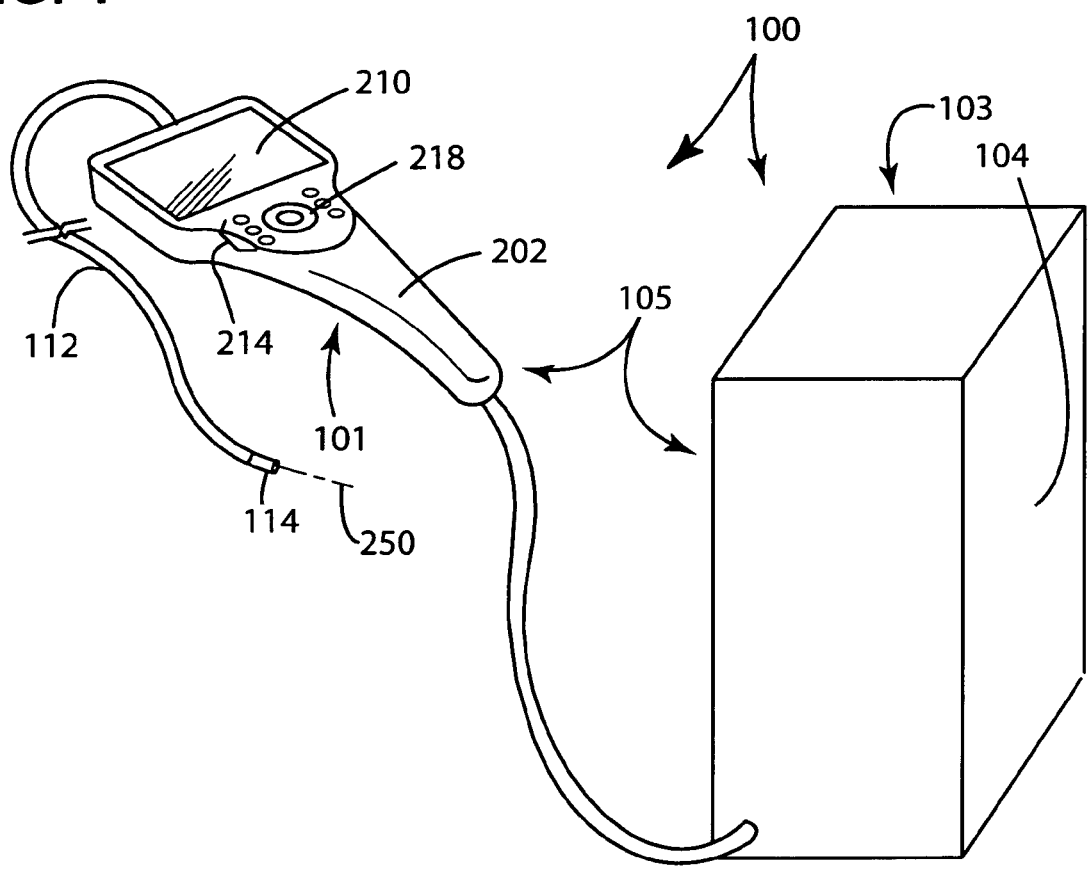
FIG. 4 is an exemplary physical form view for an inspection apparatus.

Exemplary physical form views of the apparatus 100 shown in an electrical block view of FIG. 2 are shown in FIGS. 3 and 4. In the view of FIG. 3, apparatus 100 includes elongated inspection tube 112, head 115, and handset 101 incorporating housing 102, display 210, keyboard 214, and joystick 218. Circuits 150, 152, 156, 158, 160, 162, 164, 172, and 180 can be incorporated in housing 102. In the embodiment of FIG. 4, apparatus 100 includes a base unit 103 having a housing 104 incorporating a subset of the circuits shown in FIG. 2. For example, housing 104 can incorporate circuits 162, 164, 180, and 172. Handset 101 of FIGS. 3 and 4 can be a hand held handset sized and shaped to be held in a human hand. Skilled artisans will recognize that modifications to the circuit of FIGS. 2 may be required if the circuits therein are distributed between a plurality of housings. For example, serial-deserializer circuits and twisted pair couplings as are explained in U.S. Provisional Patent Application No. 60/786,829 filed Mar. 27, 2006, incorporated herein by reference can be employed to transmit required video and control signals over distances of several feet at a high data rate. Additional circuits might be employed for communicating user initiated control signals generated at handset 101 to base unit 103. Additional circuits might also be employed for communicating image signals from base unit 103 to handset 101.

In one embodiment, apparatus 100 can have a base assembly 105, incorporating the components designated within dashed-in border 105 of FIG. 2. The components of base assembly 105 can be spread out into one or more housings. In the embodiment of FIG. 3, a single housing base assembly is provided. In the embodiment of FIG. 4, base assembly 105 comprises handset 101 and base unit 103. In another embodiment (not shown), base assembly 105 can include handset 101 and base unit 103. However, rather than being interfaced to handset 101, elongated inspection tube 112 can be interfaced to base unit 103.

Figure 5:
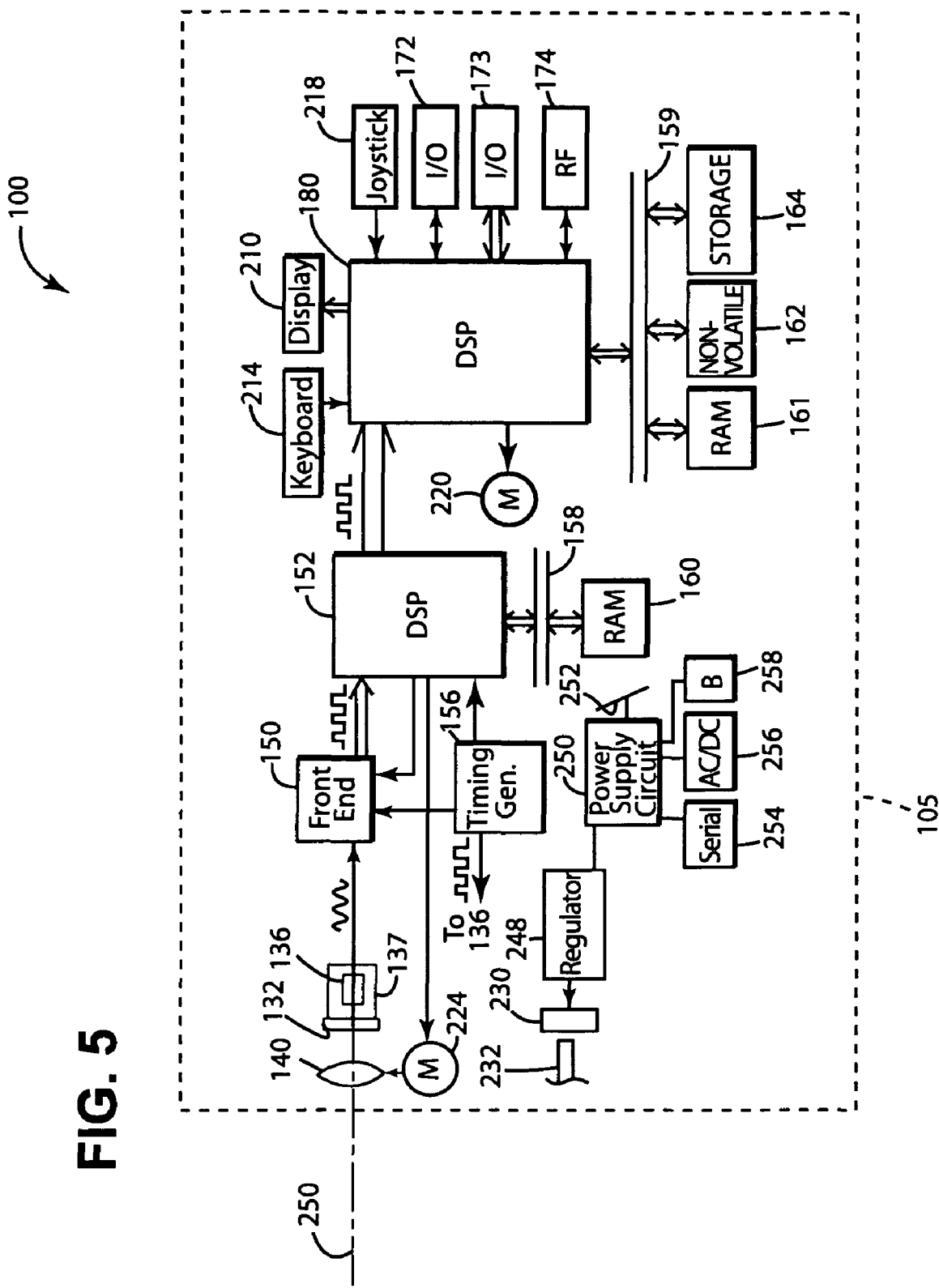
FIG. 5 is an alternative electrical block diagram illustrating an exemplary set of circuits that can be incorporated in an inspection apparatus.

While methods described herein can be carried out utilizing an inspection apparatus having an elongated inspection tube, methods described herein can be carried out utilizing an inspection apparatus other than inspection apparatuses having an elongated inspection tube. In FIG. 5 there is shown an inspection apparatus 100 devoid of an elongated inspection tube. In the embodiment of FIG. 5, apparatus 100 is provisioned similarly to the embodiment of FIG. 2 except that imaging lens 140 as well as image sensor 132, signal conditioning circuit 136, and circuit board 137 are incorporated in base assembly 105. In the embodiment of FIG. 5, inspection apparatus 100 can include zoom lens motor 224 for varying a focal distance of inspection apparatus 100.

Figure 6:
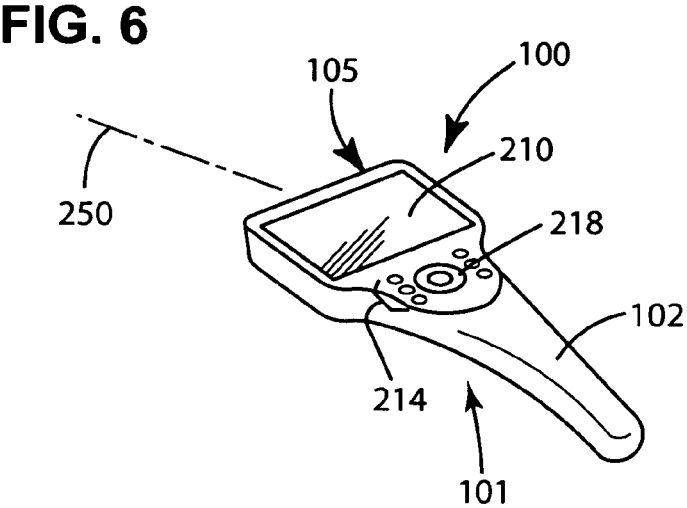
FIG. 6 is an alternative physical form view of an inspection apparatus.
Figure 7:
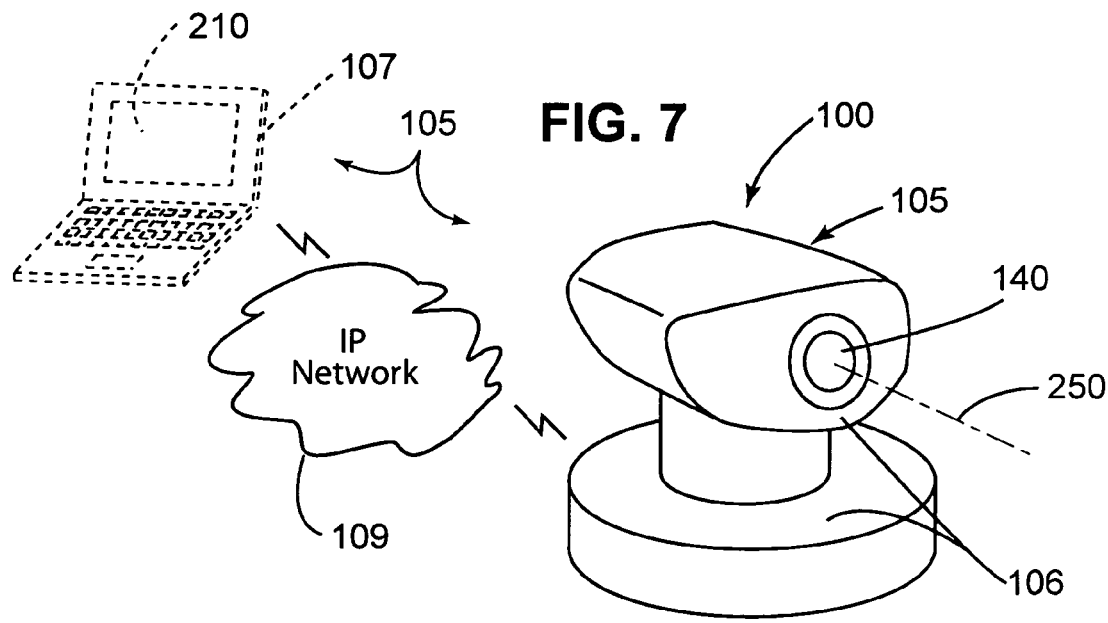
FIG. 7 is an alternative physical form view of an inspection apparatus.

Base assembly 105, in the embodiment of FIG. 5, can take on a variety of forms. In the embodiment of FIG. 6 showing an inspection apparatus in the form of a hand held digital camera, base assembly 105 is provided by a hand held housing 102. The embodiment of FIG. 6 is similar to the embodiment of FIG. 3 except that whereas in the embodiment of FIG. 3 imaging lens 140 as well as image sensor 132, signal conditioning circuit 136 and circuit board 137 are incorporated in head assembly 114, imaging lens 140 as well as image sensor 132, signal conditioning circuit 136 and circuit board 137 in the embodiment of FIG. 6 are incorporated in base assembly 105 which in the embodiment of FIG. 6 is provided by a hand held housing 102. In the embodiment of FIG. 6, imaging axis 150 of apparatus 100 extends through hand held housing 102. In the embodiment of FIG. 7, inspection apparatus 100 is provided in the form of a pan-tilt-zoom (PTZ) camera. A PTZ camera as shown in FIG. 7 can be adapted to be mounted on a flat surface such as a ceiling, wall, table, or such as may be provided by a mounting platform of a robot. A PTZ camera as shown in FIG. 7 can be used in a variety of inspection applications such as robot inspections and surveillance monitoring. In the embodiment of FIG. 7, circuit components can be incorporated as shown in FIG. 5 such that imaging lens 140 as well as image sensor 132, signal conditioning circuit 136, and circuit board 137 are incorporated in base assembly 105 provided as shown in FIG. 7 by PTZ camera housing 106. In the embodiment of FIG. 7, imaging axis 250 can extend through a camera housing 106 as shown in the embodiment of FIG. 7. Referring still to the embodiment of FIG. 7 which can incorporate the circuit distribution of FIG. 5, inspection apparatus 100 can incorporate motor assembly 222 for controlling a pan and tilt of the inspection apparatus when provided by an inspection apparatus in the form of a PTZ camera. Keyboard 214, display 210, and joystick 218 (pointer controller) can be provided on board PTZ camera housing 106 as shown in FIG. 7, or else may be distributed into an inspection apparatus housing spaced apart from PTZ camera housing 106. As indicated by dashed-in laptop PC housing 107 of FIG. 7, circuits of FIG. 5 can be distributed into housings extraneous from housing 106. A PC incorporated in housing 107 can include various circuits such as DSP 180 and other areas and can be configured to perform various image processing methods as described herein. A PC incorporated in housing 107 can be connected to the PTZ camera incorporated in housing via IP network 109. Inspection apparatus 100 can also be provided by a camera of a machine vision system for use in an assembly process or other industrial process.

It has been described that in one embodiment, inspection apparatus 100 can be configured to process image data of one or more frames to determine a motion parameter and can further be configured to process a plurality of frames to determine a noise reduced frame of image data. Inspection apparatus 100 can further be configured so that responsively to the processing of image data for determination of a motion parameter, apparatus 100 can selectively output the noise reduced frame to a display. In a further aspect, inspection apparatus 100 can output a series of noise reduced frames to a display in the formation of a displayed video image. Inspection apparatus 100 can be configured to selectively output a noise reduced frame on the condition that a stopped condition is detected and can further be configured to avoid outputting of a noise reduced frame of image data on the condition that an in motion condition is detected.

Various methods for detecting motion are now described. Where image sensor 132 is of the type having an interlaced frame readout mode wherein an odd field of a frame is read out and then an even field, motion can be detected for by subtracting the even field from the odd field. The difference result can be scaled to yield a motion parameter score, e.g., between 0 and 9, wherein 0 is a score for no motion and 9 is a score for extensive motion. When head assembly 114 is not in motion, a motion parameter score can be expected to be about 0, though diagonal lines and/or horizontal edges may cause non-zero difference results. Even so, such analysis of frames including such diagonal lines and/or horizontal edges generally yields lower difference results for motion-free frames than for frames with motion. For converting a motion score to a binary motion parameter, i.e., "in motion" or "motion free" classification, the score can be subject to thresholding (i.e., all scores below 2 are deemed to be motion free).

In another method for detecting motion, apparatus 100 can evaluate first and second successively determined frames. In evaluating first and second successively determined frames, apparatus 100 can locate one or more common edges in first and second frames, and can subtract pixel positions forming the common edge of the second frame from the first frame to derive a motion parameter scalable to scale, e.g., from 0 to 9. When head assembly 114 is not in motion, a motion parameter degree of motion score can be expected to be about 0. For converting a score to a binary motion parameter, i.e., "in motion" or "motion free" classification, the score can be subject to thresholding (i.e., all scores below 2 are deemed to be motion free).

In yet another method for detecting motion, apparatus 100 can examine image data of first and second successively determined super frames. Each super frame can be determined by processing a set of M successively captured single frames (i.e., frames having image data corresponding to a specific frame readout period). The processing can include, e.g., averaging or summing M successively captured single frames. In one example, with a set of 10 successively captured frames, 0 to 9, a first super frame can be derived by averaging frames 0 through 4 and the second super frame can be derived by averaging frames 5 through 9. For conservation of processing requirements, accumulators may be employed for averaging. Super frames can be determined on a moving window basis. For example, during a first frame period, a first accumulator can retain the average or sum of frames N . . . (N+4), and a second accumulator can retain the average or sum of frames N+5 . . . N+9. In a next frame period, the first accumulator can retain the average or sum of frames N+1 . . . N+5 and the second accumulator can retain the average or sum of frames N+6 . . . N+10. In evaluating first and second successively determined super frames, apparatus 100 can locate a common edge in first and second super frames, and subtract pixel positions forming the common edge of the second super frame from the first super frame to derive a motion parameter scalable to scale, e.g., from 0 to 9. When head assembly 114 is not in motion, a motion parameter score can be expected to be about 0. For converting a score to a binary motion parameter, i.e., "in motion" or "motion free" classification, the score can be subject to thresholding (i.e., all scores below 2 are deemed to be motion free). In another embodiment, apparatus 100 can be configured to subtract a super frame from a preceding super frame for purposes of developing a motion parameter. The examination of super frames for determination of a motion parameter is particularly useful where the video stream being examined has a low signal-to-noise ratio. By summing or averaging multiple frames into a super frame, random noise levels are reduced. Thus, comparisons between super frames to detect motion are less affected by noise than would be comparisons between single frames. The signal-to-noise level of a video stream can be expected to be lower, the lower the brightness level of the video stream. Accordingly, in one embodiment, inspection apparatus 100 can be configured to examine a brightness level of incoming frames, and responsively to a detected brightness can be made to switch out of operating in a first mode wherein the inspection apparatus examines differences between single frames for detection of motion to a mode wherein the apparatus examines super frames for detection of motion.

Figure 12:
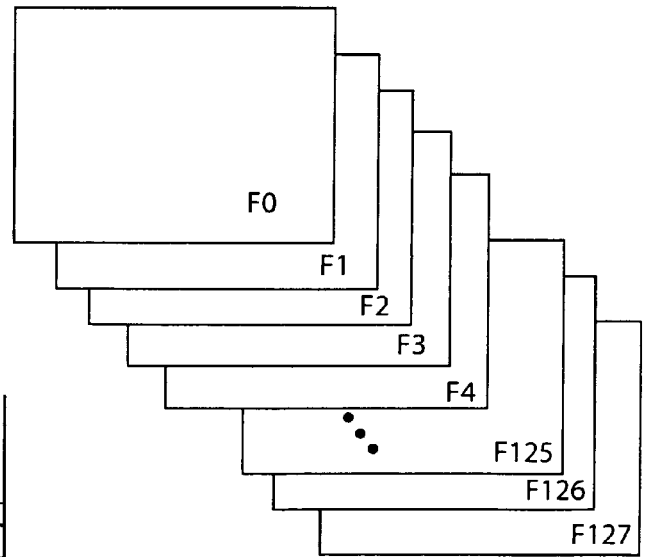
FIG. 12 is a representation of a set of frames that can be subject to processing by an inspection apparatus.
Figure 13:
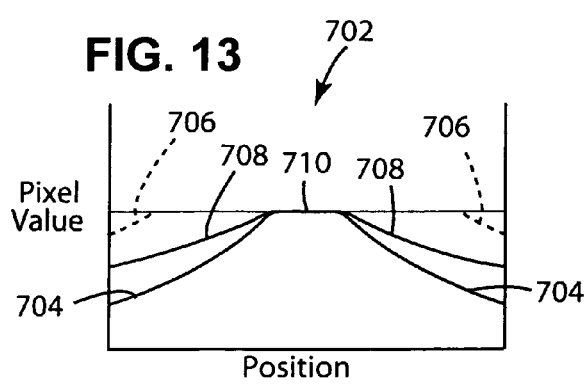
FIG. 13 is a plot illustrating application of non-uniform digital gain in one embodiment.

Methods for providing a noise reduced frame are now described. A noise reduced frame can be provided by processing a plurality of captured frames. The plurality of frames that can be processed for providing a noise reduced frame can be successive frames or non-successive frames. For example, apparatus 100, as described in connection with FIG. 12 can be configured to process a set of 128 frames ($F_o$ . . . $F_{127}$) in determining a noise reduced frame. In processing the frames, apparatus 100 can determine if the frames are in motion, and can discard frames from the frames determined to be in motion. In discarding a frame, apparatus 100 can avoid inputting a frame determined to be in motion into an accumulator retaining a noise reduced frame. Apparatus 100 can also be configured to locate an edge in each frame and offset frames of the set of frames so that located edges are aligned. In offsetting a frame, apparatus 100 can offset a frame prior to accumulating the frame in an accumulator. Processing of a plurality of frames to determine a super frame can include averaging several frames or by otherwise utilizing image data from the plurality of frames to provide a noise reduced frame. A noise reduced frame provided by averaging a plurality of successively captured frames can be regarded as a frame averaged noise reduced frame. A noise reduced frame can also be regarded as a "filtered" frame.

Figure 8:
FIG. 8 shows a representation of a set of alternative masks that can be applied for noise reduction.

A noise reduced frame can be provided other than by processing of several single frames (e.g., as in a processing to average several frames). For example, a noise reduced frame can be provided by application of a noise reducing filter mask kernel, e.g., a filter mask kernel, to a single frame. Suitable kernels for use in providing a noise reduced frame are shown in FIG. 8. Kernels as shown in FIG. 8 for use in reducing noise can be referred to as weighted average masks. For conservation of processing requirements, an accumulator can be employed for averaging where a noise reduced frame is provided by averaging several frames. For increasing a dynamic range of an output noise reduced frame, an accumulator having a bit count larger then the bit count of a frame's pixel value can be selected. For example, pixel values of a raw frame can be 8 bits and an accumulator accumulating frames can be 16 bits.

Apparatus 100 can be configured so that apparatus 100 selectively outputs one or more noise reduced frames to display 210 when apparatus 100 detects a stopped condition, and selectively avoids outputting one or more noise reduced frames to display 210 when apparatus 100 detects an in motion condition. In a particular embodiment, apparatus 100 can be configured so that apparatus 100 selectively outputs a frame averaged noise reduced frame to display 210 when apparatus 100 detects a stopped condition, and selectively avoids outputting one or more frames averaged noise reduced frames to display 210 when apparatus 100 detects an "in motion" condition. In selectively outputting a noise reduced frame, apparatus 100 can read out a noise reduced frame from an accumulator. Apparatus 100 can continuously output frames from an accumulator to display 210 in the formation of a video image. In another aspect, apparatus 100 can be configured to successively output updated noise reduced frames to display 210 in the formation of a streaming video image on display 210 comprising noise reduced image data. For example, apparatus 100 can include a first accumulator frame buffer accumulating a first noise reduced frame, and a second accumulator buffer accumulating a second noise reduced frame. Apparatus 100 can be configured so that while repetitively outputting a noise reduced frame from the first accumulator, the second accumulator can be accumulating incoming frames, and further so that when repetitively outputting a frame from the second accumulator, the first accumulator is accumulating incoming frames. For forming a noise reduced streaming video image, apparatus 100 can successively and alternatingly output noise reduced frames from the first and second accumulators.

Inspection apparatus 100 can be configured so that inspection apparatus 100 can initiate various other controls responsively to processing of image data for determination of a motion parameter. Such additional controls can be initiated in addition to or as an alternative to the control described above wherein apparatus 100 selectively outputs a noise reduced frame to display 210 responsively to a processing of image data for determination of motion parameter.

Referring to additional controls that can be initiated by inspection apparatus 100 responsively to a determination of a motion parameter, inspection apparatus 100 can be configured so that inspection apparatus 100 can adjust a digital gain of an output frame of image data responsively to a processing of image data for determination of a motion parameter. In one example, inspection apparatus 100 can increase a digital gain of a frame of image data for output responsively to a detection of a stopped condition so that a frame or frames of image data output to display 210 subsequent to a detection of stopped condition are digitally brightened. For increasing a digital gain of a frame of image data, apparatus 100 can scale up pixel values making up the frame of image data. By increasing a digital gain of a frame of image data output to display 210, details represented in a displayed frame of image data may be more easily observed by an inspector. In one embodiment, the frame or frames that are subject to digital gain adjustment can be frame averaged noise reduced frames, which frames can be retained in an accumulator by utilizing an accumulator having a higher bit count (e.g., 16 bit, having up to 65,535 levels) than a bit count of a frame pixel value (e.g., 8 bit having 256 levels), digital gain can be applied to provide an output frame without use of missing pixel output codes. Where apparatus 100 is not configured to output a frame averaged noise reduced frame responsively to a processing for determination of a motion parameter, the frame or frames output responsively to a processing for determination of a motion parameter can be frames output from a raw frame buffer of apparatus 100.

Figure 9:
FIG. 9 shows a representation of a set of alternative masks that can be applied for edge enhancement.

Referring to further additional controls that can be initiated by apparatus 100 responsively to a determination of a motion parameter, inspection apparatus 100 can output an edge enhanced image to display 210 responsively to a processing of image data for determination of a motion parameter. In one example, inspection apparatus 100 can output an edge enhanced frame of image data responsively to a detection of a stopped condition so that a frame or frames of image data output to display 210 subsequent to a detection of stopped condition are displayed with edges enhanced. For providing an edge enhanced frame of image data, apparatus 100 can apply an edge enhancing mask kernel, such as a Laplacian of Gaussian (LoG) filter to a frame of image data. In one embodiment, apparatus 100 can vary the mask kernel that is actuated based on the number of frames in the accumulator. Apparatus 100 can be configured so that when few frames are accumulated, a relatively weaker edge enhancement filter can be actuated, and further so that when a relatively large number of frames is accumulated (indicating a greater level of noise reduction), a relatively stronger filter mask can be applied to increase an amount of edge enhancement. Suitable kernels for use in edge enhancement are shown in FIG. 9. By outputting an edge enhanced frame of image data, an inspector can more easily observe edges on a represented area of interest. In one embodiment, the frame or frames that are subject to edge enhancement can be frame averaged noise reduced frames, which frames can be retained in an accumulator. Where apparatus 100 is not configured to output a frame averaged noise reduced frame responsively to a processing for determination of a motion parameter, the frame or frames output responsively to a processing for determination of a motion parameter and subject to edge enhancement can be frames output from an input-frame buffer of apparatus 100.

Referring to still further additional controls that can be initiated by apparatus 100 responsively to a determination of a motion parameter, inspection apparatus 100 can activate a different imaging parameter determination algorithm responsively to a processing of image data for determination of a motion parameter. Imaging parameters can include such parameters as exposure period (exposure) and analog gain. Referring again to the block diagram of FIG. 2, timing generator circuit 156 may adjust an exposure control timing signal to signal conditioning circuit 136 for adjustment of an exposure parameter. DSP 152 may adjust a control signal input to front end 150 for adjustment of analog gain. In one embodiment there can be provided a first imaging parameter determination algorithm for determination of at least one of an exposure period and analog gain input into said inspection apparatus 100 and a second imaging parameter determination algorithm for determination of at least one of an exposure period and analog gain input into said inspection apparatus 100, the second imaging parameter determination algorithm being different from said first imaging parameter determination algorithm. In a further aspect, inspection apparatus 100 can be configured so that an activation of the first or the second parameter determination algorithms is responsive to a processing of image data for determination of a motion parameter.

In a particular embodiment, inspection apparatus 100 can be configured so that when an "in motion" condition is detected, the first imaging parameter determination algorithm is made active and further, so that when a stopped condition is detected, the second imaging parameter determination algorithm is made active.

Operating in accordance with the first or the second imaging parameter determination algorithms, inspection apparatus 100 can attempt to control an output image signal input to DSP 152 so that changing brightness conditions are compensated for. In one method for compensating for a decrease in ambient illumination and detected brightness, an exposure period can be increased. In another method for compensating for a decrease in detected brightness analog gain can be increased. In one embodiment, the first and the second imaging parameter determination algorithms are differentiated in that an exposure period imaging parameter applied by apparatus 100 under a given detected brightness is of longer duration when the second imaging parameter determination algorithm is active than when the first imaging parameter determination algorithm is active. In one embodiment, the first and the second imaging parameter determination algorithms are differentiated in that an analog gain imaging parameter applied by the apparatus under a given detected brightness is of a lower level when the second imaging parameter determination algorithm is active than when the first imaging parameter determination algorithm is active. Accordingly, in the described embodiment, when a stopped condition is detected, apparatus 100 can deactivate the first "in motion" imaging parameter determination algorithm and can activate the second imaging parameter determination algorithm so that low brightness conditions are compensated for with longer exposure periods than would have been applied in the presence of an "in motion" condition. The inventors noted that problems associated with application of longer exposure periods, e.g., smearing, can be avoided if the apparatus is restricted from applying such longer exposure periods (e.g., above a threshold) unless a stopped condition is detected.

A flow diagram illustrating operation of inspection apparatus 100, in one embodiment, is described with reference to FIG. 10. At block 702 apparatus 100 can process image data of one or more frames to determine if a motion stopped condition has been detected. If a motion stopped condition has been detected (block 704), apparatus 100 proceeds to block 706 to commence outputting one or more filtered frames to display 210, to block 708 to increase a digital gain of a displayed frame of image data, to block 709 to apply edge enhancement to a displayed frame of image data, and then to block 710 to activate a second imaging parameter determination algorithm. As indicated, each of blocks 706, 708, 709, 710 is optional.

Figure 11:
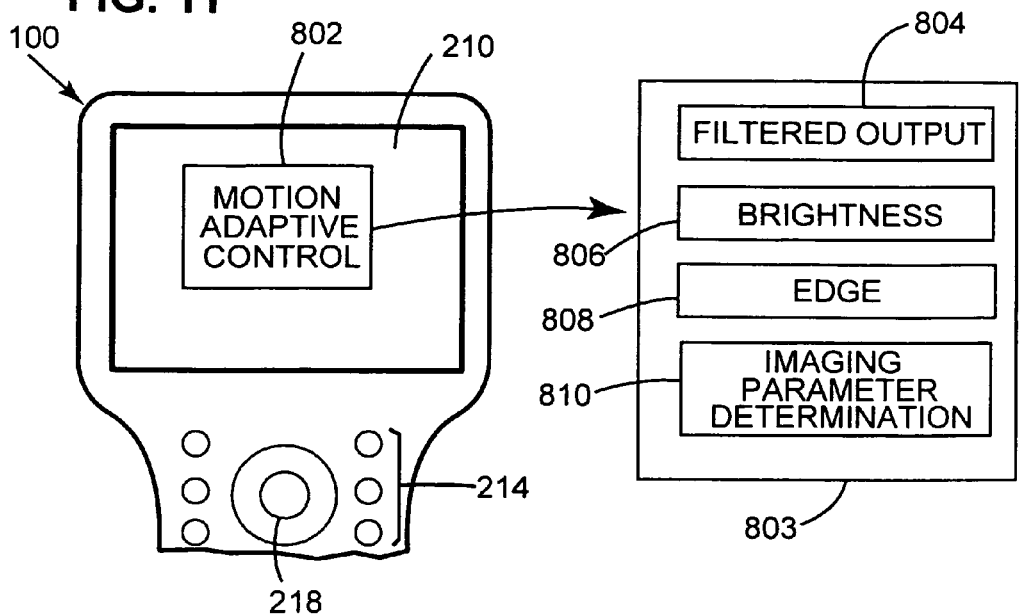
FIG. 11 shows an exemplary user interface for an inspection apparatus in one embodiment.

In another aspect, inspection apparatus 100 can be configured to include a user interface enabling an operator to selectively enable or disable any of the motion responsive controls described herein. In one example, a graphical user interface can be provided as shown in FIG. 11. Inspection apparatus 100 can be configured so that if button 802 is actuated, window 803 appears enabling an inspector to enable or disable various motion responsive controls. Apparatus 100 can be configured so that if filtered output button 804 is actuated, apparatus 100 is configured to output a filtered frame of image data in accordance with one of the described embodiments responsively to a processing of image data. Apparatus 100 can be configured so that if brightness button 806 is actuated, apparatus 100 is configured to output a filtered frame of image data in accordance with one of the described embodiments responsively to a processing of image data. Apparatus 100 can be configured so that if edge button 808 is actuated, apparatus 100 can be configured to output an edge enhanced frame of image data in accordance with one of the described embodiments responsively to a processing of image data. Apparatus 100 can be configured so that if imaging parameter determination button 810 is actuated, apparatus 100 is configured to activate a second imaging parameter determination algorithm in accordance with one of the described embodiments responsively to a processing of image data.

In another aspect, inspection apparatus 100 can be configured to apply digital gain non-uniformly over a frame of image data. In one embodiment, apparatus 100 can be configured to determine position dependent digital gain parameters for pixel values of a frame of image data and to apply the determined position dependent digital gain parameters in determining pixel values of a frame of image data for outputting to a display and/or a memory device. The frame of image data for which non-uniform gain parameters can be determined can be a frame corresponding to a live target in a field of view of apparatus 100.

Inspection apparatuses are often used to capture frames of image data representing shiny surfaces. When a frame of image data representing a shiny surface is captured, illumination tends to reflect off the shiny surface causing what is often termed an over-bloomed bright spot in a frame of image data. In that bright spots will affect an overall brightness level used to determine applied digital gain and/or exposure parameters according to an imaging parameter determining algorithm, the presence of over-bloomed bright spots can lead to applied exposure period parameters and/or analog gain being too low, resulting in a frame of image data that is too dark in all but the area of an over-bloomed bright spot.

For addressing the problem of over-bloomed bright spots, inspection apparatus 100 can be configured to apply digital gain non-uniformly over a frame of image data in order to selectively brighten a frame of image data in areas other than a bright spot without substantial or without any brightening of a frame of image data in an area about a bright spot. Inspection apparatus 100 can also be configured to apply offsets non-uniformly over a frame of image data in order to reduce a washout effect of a frame of image data.

An exemplary method for outputting a frame of image data utilizing a set of position dependent non-linear digital gain values is as follows:

1. Add up luminance (e.g., gray scale) values for pixel positions within a region surrounding each pixel position (e.g., a 16×16 pixel position area) to obtain a regional brightness value for each pixel position.
2. Provide a lookup table mapping regional sum values to digital gain values (parameters). The lookup table, in one embodiment, can map larger digital gain values to smaller regional brightness values and zero or near-zero digital gain values to larger regional brightness values.
3. Determine a position dependent digital gain value utilizing the lookup table for each pixel position.
4. For each pixel position multiply the original pixel value by the determined digital gain value.

Figure 10:
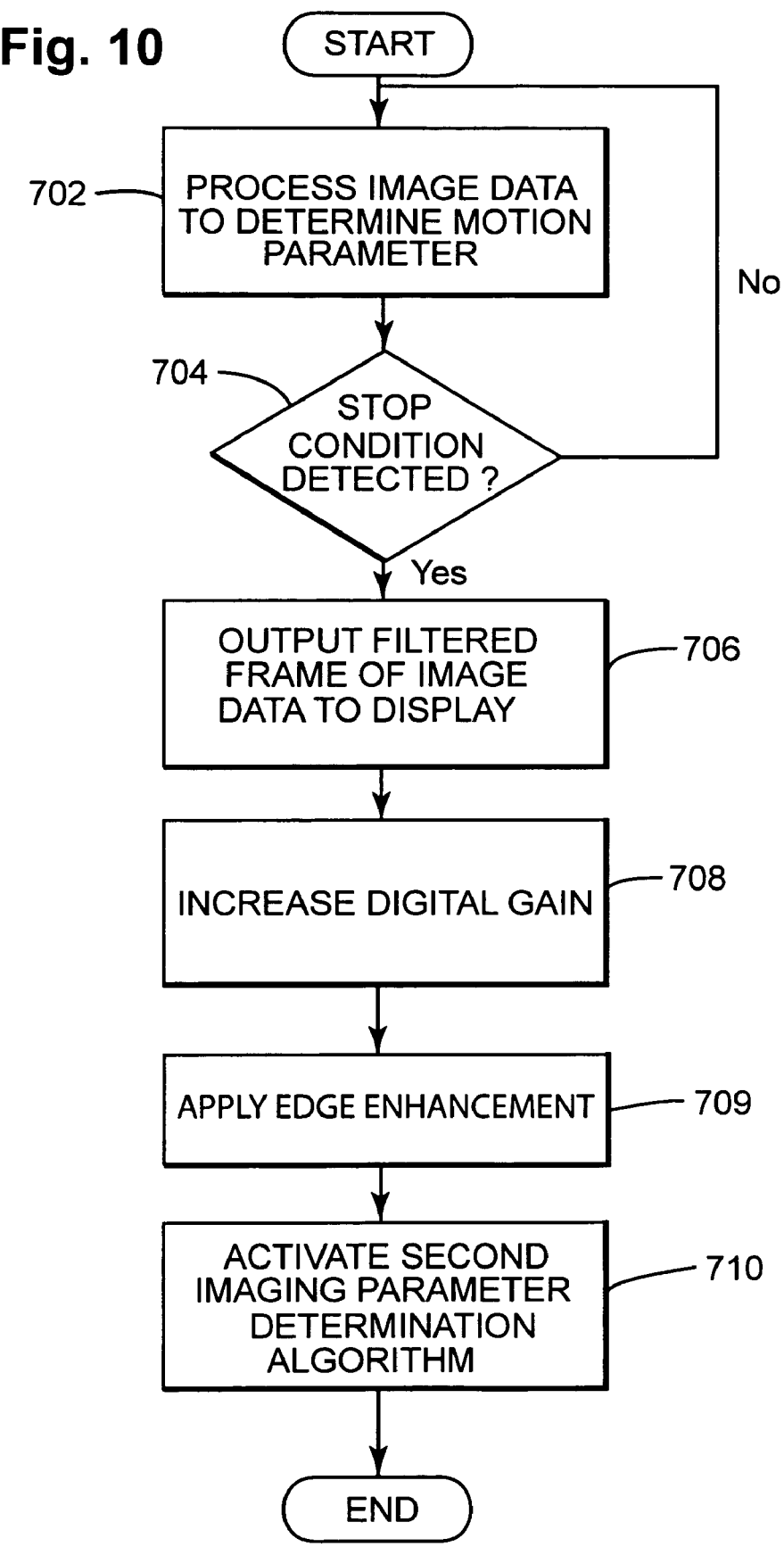
FIG. 10 is a flow diagram illustrating operation of an inspection apparatus in one embodiment.

The result of applying non-uniform digital gain values determined responsively to the determination of regional brightness values is described in greater detail with reference to the plot of FIG. 10 showing pixel values through an arbitrary line of pixel positions within a bright region of pixel positions.

Referring to plot 702, line 704 indicates pixel brightness values for a row of pixels which is relatively dark at the left side and gradually brightens across the line. At the right side of the row, the brightness values clipped at the maximum possible value (e.g., 255 in an 8 bit pixel value frame), as shown by line 710. Dotted line 706 indicates a would-be pixel values if gain were applied uniformly, and bold line 708 indicates pixel values where non-uniform digital gain as described herein is applied. Referring to plot 702 it is seen with reference to the original image data 704 that several pixel values may be clipped at the peak 710 pixel value (indicating a possible over-bloomed bright spot). However, referring to image data 706 after application of a uniform digital gain parameter, several additional pixels can be clipped at the peak pixel value, resulting in loss of contrast information useful to an inspector. Referring to image data 708 after application of non-uniform digital gain, digital gain may be applied to increase pixel values in the non-clipped portions of the row; however, substantially no additional pixel values are clipped at the maximum pixel value. Accordingly, by application of the non-uniform gain parameters determined responsively to a determination of regional brightness values, clipping of additional pixel values is substantially avoided. According to the method described herein, wherein non-uniform digital gain parameters are determined responsively to a determination of regional brightness values, pixel positions of relatively darker pixel valued regions of a frame (darker regions) can have applied thereto digital gain parameters which would result in clipping of pixel values of pixel positions of relatively brighter pixel value regions (brighter regions) of a frame. Also, pixel positions of a relatively bright pixel value region of a frame can have applied thereto digital gain parameters smaller in value than the digital gain parameters applied to the relatively darker pixel position region. Application of the relatively smaller digital gain parameters determined responsively to a determination of a regional brightness value within a region will result in clipping of a fewer number of pixel values than would have been clipped by application of uniform gain parameter sufficient to render darker pixel values visibly brighter. A region can be regarded herein as a set of positionally adjacent pixel positions, e.g., a block of 16×16 positionally adjacent pixel positions.

In addition, another lookup table can be provided to provide mapping between regional sum values and a set of offset values. Such mapping can map larger offset values to smaller regional brightness values and little or no offset values to larger regional brightness values to reduce a "washout effect" when only gain is used. For example, when gain is applied to a frame, fine detail transitions might be amplified, but nevertheless, may not be rendered highly visible if the image data forming a transition has high white values (e.g., the human eye has difficulty in perceiving differences in differentiated but high gray scale values). For example, a human eye may have difficulty in perceiving an edge formed by an edge comprising 220 and 250 white level pixel values (the "washout effect"). The washout effect can be addressed by applying an offset, e.g., subtracting 100 from the area of the transition so that it is represented by pixel values having white levels of 120 and 150. For improving a quality of an image, offset can be applied non-uniformly by mapping pixel positions to offset parameters as indicated. For example, so that a white spot retains its appearance as a white spot in a frame of image data having offsets applied, it would not be desirable to have offsets applied to a white spot. By application of non-uniform offset pixel values of pixel positions that are in relatively dark regions prior to application of gain can be reduced by an offset so that transitions represented therein can be rendered more visible to an observer (e.g., an inspector). Pixel values of pixel positions of relatively bright regions prior to application of gain can have relatively little offset applied so that they are represented in accordance with their original brightness levels.

In one embodiment, the frame of image data to which non-uniform digital gain and/or offset parameters are applied can be buffered frames of image data of an output frame buffer for output to display in a streaming video display.

In another embodiment, the frame of image data to which non-uniform digital gain and/or offset parameters are applied can be a frame of image data output to a memory device from a frame buffer (e.g., an input frame buffer) in response to an initiation of save frame control signal.

In another embodiment, the frame of image data to which non-uniform digital gain and/or offset parameters can be applied can be a frame of image data output to a display from a frame buffer (e.g., an output frame buffer) responsively to a processing of image data for determination of a motion parameter.

In another embodiment, the frame of image data to which non-uniform digital gain and/or offset parameters can be applied can be a noise reduced frame provided by processing of several frames and retained in an accumulator buffer as described herein. A noise reduced frame provided by processing of several frames can be output to a display responsively to a processing of image data for determination of a motion parameter. Such a noise reduced frame to which non-uniform digital gain and/or offset parameters can be applied can also be a frame that is output to a memory device in response to an initiation of a save frame control signal. By applying non-uniform digital gain and/or offset parameters to a frame provided by processing of several single frames, noise is reduced prior to the application of the digital gain. Thus, the applied digital gain tends to make image details more visible without creating a high noise level as may occur when digital gain is applied to a single potentially noisy frame. Additionally, where non-uniform digital gain and/or offset parameters are applied to a frame provided by processing several single frames, the accumulation of frames effectively increases the dynamic range available (such as from an 8-bit single frame to a 16-bit accumulator) allowing the application of digital gain without reducing the number of achievable output levels as described previously with uniform digital gain. It may further be desirable to use different digital gain and offset tables based on the number of accumulated frames such that lower gains are applied when few frames are accumulated and higher gains are applied when more frames are accumulated. This approach minimizes the amplification of image noise when few frames are accumulated while allowing significant enhancement with little noise once many frames have been accumulated. It also provides a gradual transition in the image appearance which is generally preferred over abrupt changes as would be seen if no enhancement were applied while in motion and full enhancement were applied when motion stops and frame accumulation begins.

A small sample of the methods of an apparatus described herein are as follows.

There is also described (A1) A method for operating a display equipped inspection apparatus having an elongated inspection tube and an image sensor for generating image signals, said method comprising the steps of: (a) processing image data of one more frames to determine at least one motion parameter; (b) processing a plurality of frames of image data to determine a noise reduced frame of image data; and (c) responsively to said processing step (a), selectively outputting said noise reduced frame of image data to said display. There is also described (A2) The method of claim A1, wherein said outputting step includes the step of selectively outputting said noise reduced frame when said at least one motion parameter indicates a stopped condition. There is also described (A3) The method of claim A1, wherein said processing step (a) includes the step of processing image data of one or more frames to determine at least one motion parameter in the form of a classification of a frame of image data as an in motion frame or motion free frame indicating a stopped condition. There is also described (A4) The method of claim A1, wherein said processing step (a) includes the step of processing super frames, each super frame determined by processing more than one frame. There is also described (A5) The method of claim A1, wherein said processing step (b) includes averaging said plurality of frames. There is also described (A6) The method of claim A1, wherein said noise reduced frame has applied thereto at least one of non-uniform digital gain parameters and non-uniform offset parameters. There is also described (A7) The method of claim A1, wherein said noise reduced frame has applied thereto a uniform digital gain parameter. There is also described (A8) The method of claim A1, wherein said noise reduced frame has applied thereto at least one of non-uniform digital gain and offset parameters, the at least one of digital gain and offset parameters being applied so that darker areas of said noise reduced frames are brightened without substantial or without any brightening of a white spot in said noise reduced frame.

There is also described (B1) An inspection apparatus comprising: an elongated inspection tube; a two dimensional image sensor generating image signals; and a display; wherein said inspection apparatus is configured for processing image data of one or more frames for detection of a motion stopped condition; wherein said inspection apparatus is further configured to process a plurality of frames of image data to determine a noise reduced frame of image data; and wherein said inspection apparatus is further configured to selectively output said noise reduced frame responsively to a detection by said inspection apparatus of said motion stopped condition.

There is also described (C1) A method for operating a display equipped inspection apparatus having an elongated inspection tube and an image sensor for generating image signals, said method comprising the steps of: (a) processing image data of one more frames to determine at least one motion parameter; (b) outputting frames of image data to said display; and (c) adjusting a digital gain of image data of said frames output to said display responsively to said processing of step (a) so that a brightness of image data transferred to said display is increased when a stopped condition is detected.

There is also described (C2) The method of claim C1, wherein said method further includes the step of processing a plurality of single frames to determine noise reduced frames and wherein said outputting step includes the step of selectively outputting said noise reduced frames to said display responsively to said processing.

There is also described (D1) A method for operating a display equipped inspection apparatus having an elongated inspection tube and an image sensor for generating image signals, said method comprising the steps of: (a) providing a first imaging parameter determination algorithm for determination of at least one of an exposure period and analog gain input into said inspection apparatus; (b) providing a second imaging parameter determination algorithm for determination of at least one of an exposure period and analog gain input into said inspection apparatus, the second imaging parameter determination algorithm being different from said first imaging parameter determination algorithm; (c) processing image data of one or more frames to determine at least one motion parameter; (d) switching between activation of said first imaging parameter determination algorithm and activation of said second imaging parameter determination algorithm responsively to said processing of step (c). There is also described (D2) The method of claim D1, wherein said switching step includes the step of switching to said second algorithm when said motion parameter indicates a stopped condition. There is also described (D3) The method of claim D1, wherein said switching step includes the step of switching to said second algorithm when said motion parameter indicates a stopped condition, and wherein an exposure period input into said inspection apparatus when said second imaging parameter determination algorithm is active for a given detected brightness is of longer duration than an exposure period input into said inspection apparatus when said first imaging parameter determination algorithm is active. There is also described (D4) The method of claim D1, wherein said switching step includes the step of switching to said second algorithm when said motion parameter indicates a stopped condition, and wherein an analog gain input into said inspection apparatus when said second imaging parameter determination algorithm is active for a given detected brightness is lower than an analog gain input into said inspection apparatus when said first imaging parameter determination algorithm is active.

There is also described (E1) A method for operating an inspection apparatus having an elongated inspection tube and an image sensor for generating image signals, said method comprising the steps of: processing a frame of image data corresponding to a present field of view of said apparatus for determining for said frame of image data at least one of a set of position dependent non-uniform digital gain parameters and a set of position dependent non-uniform offset parameters, the position dependent non-uniform digital gain parameters being determined responsively to a determination of regional brightness values of said frame, the position dependent non-uniform digital offset parameters also being determined responsively to a determination of regional brightness values of said frame; applying at least one of said set of position dependent non-uniform digital gain parameters and a set of position dependent non-uniform offset parameters to a frame of image data; and outputting to said display a frame of image data having at least one of said set of position dependent non-uniform digital gain parameters and a set of position dependent non-uniform offset parameters applied. There is also described (E2) The method of claim E1, wherein said method further includes the step of detecting motion in a video stream, and wherein said outputting step includes the step of outputting said frame of image data conditionally on the condition that a motion stopped condition is detected. There is also described (E3) The method of claim E1, wherein said applying step includes the step of applying said position dependent digital gain and/or position dependent offset parameters to a noise reduced frame of image data provided by processing of several single frames. There is also described (E4) The method of claim E1, wherein said applying step includes the step of applying said set of position dependent non-uniform digital gain parameters. There is also described (E5) The method of claim E1, wherein said applying step includes the step of applying said set of position dependent non-uniform offset parameters.

There is also described (F1) A method for operating an inspection apparatus having an image sensor, said method comprising the steps of: processing a frame of image data corresponding to a present field of view of said apparatus to determine at least one of a set of position dependent non-uniform digital gain parameters and a set of position dependent non-uniform offset parameters; applying at least one of said set of position dependent non-uniform digital gain parameters and a set of position dependent non-uniform offset parameters for said frame of image data; and outputting to a display a frame of image data having at least one of said set of position dependent non-uniform digital gain parameters and a set of position dependent non-uniform offset parameters applied. There is also described (F2) The method of claim F1, wherein said method further includes the step of detecting motion in a video stream, and wherein said outputting step includes the step of outputting said frame of image data conditionally on the condition that a motion stopped condition is detected. There is also described (F3) The method of claim F1, wherein said applying step includes the step of applying said position dependent digital gain and/or position dependent offset parameters to a noise reduced frame of image data provided by processing of several single frames. There is also described (F4) The method of claim F1, wherein said applying step includes the step of applying said set of position dependent non-uniform digital gain parameters. There is also described (F5) The method of claim F1, wherein said applying step includes the step of applying said set of position dependent non-uniform offset parameters. There is also described (F6) The method of claim F1, wherein said position dependent non-uniform digital gain parameters are determined for brightening darker areas of said frame of image data without substantial or without any brightening of a bright spot of said frame of image data. There is also described (F7) The method of claim F1, wherein said position dependent non-uniform offset parameters are determined for reducing a washout effect. There is also described (F8) The method of claim F1, wherein said processing step includes the step of processing a frame captured utilizing an inspection apparatus in the form of an inspection apparatus having an elongated inspection tube. There is also described (F9) The method of claim F1, wherein said processing step includes the step of processing a frame captured utilizing an inspection apparatus in the form of a hand held digital camera. There is also described (F10) The method of claim F1, wherein said processing step includes the step of processing a frame captured utilizing an inspection apparatus in the form of a PTZ camera. There is also described (F11) The method of claim F1, wherein said processing step includes the step of processing a frame captured utilizing an inspection apparatus in the form of a camera of a machine vision system. There is also described (F12) The method of claim F1, wherein said processing step includes the step of determining a non-uniform digital gain parameter for a pixel position responsively to a determination of a regional brightness value for said pixel position. There is also described (F13) The method of claim F1, wherein said applying step includes the step of applying digital gain to pixel positions within a relatively darker region of said frame utilizing digital gain values which would result in clipping of pixel values if applied to a relatively brighter region of said frame, and wherein said applying step further includes the step of applying digital gain to pixel positions within a relatively brighter region of said frame utilizing such digital gain values as to avoid clipping of pixel values of said relatively brighter region.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A method for inspecting an object comprising:
   (a) providing a video inspection apparatus, wherein said video inspection apparatus has an elongated inspection tube, an image sensor, and a display;
   (b) generating a plurality of frames of image data representative of light incident on pixels of said image sensor;
   (c) utilizing the video inspection apparatus to process one or more of said plurality of frames of image data for determining at least one motion parameter for said one or more of said plurality of frames, the motion parameter representative of the motion of said one or more of said plurality of frames caused by the motion of said elongated inspection tube when said image data of one or more of said plurality of frames of image data was generated;
   (d) determining based on said motion parameter whether said elongated inspection tube was in motion or motion free when said image data of one or more of said plurality of frames of image data was generated;
   (e) processing one or more of said plurality of frames of image data to determine a noise reduced frame of image data; and
   (f) outputting said noise reduced frame of image data to said display if said motion parameter indicates a motion free condition.

2. The method of claim 1, further comprising the step of avoiding outputting said noise reduced frame of image data to said display if said motion parameter indicates an in motion condition.

3. The method of claim 1, wherein the motion parameter indicates a motion free condition when said elongated inspection tube is in a stopped condition.

4. The method of claim 1, wherein said determining step (d) is performed by comparing said motion parameter to a threshold.

5. The method of claim 4, wherein said motion parameter indicates a motion free condition when said motion parameter is below said threshold.

6. The method of claim 4, wherein said motion parameter indicates an in motion condition when said motion parameter is above said threshold.

7. The method of claim 1, wherein said step of determining at least one motion parameter includes determining the difference between the odd field of a frame and the even field of a frame.

8. The method of claim 1, wherein said step of determining at least one motion parameter includes:
   locating one or more common edges in a first frame and a second frame of successive frames; and
   determining the difference between the pixel positions forming the common edge in the first frame and the pixel positions forming the common edge in the second frame.

9. The method of claim 1, wherein said utilizing step (c) includes the step of processing super frames, each super frame determined by processing more than one frame of said plurality of frames of image data.

10. The method of claim 1, wherein said processing step (e) includes averaging said plurality of frames of image data.

11. The method of claim 1, wherein said noise reduced frame has applied thereto at least one of non-uniform digital gain parameters and non-uniform offset parameters.

12. The method of claim 1, wherein said noise reduced frame has applied thereto a uniform digital gain parameter.

13. The method of claim 1, wherein said noise reduced frame has applied thereto at least one of non-uniform digital gain and offset parameters, the at least one of digital gain and offset parameters being applied so that darker areas of said noise reduced frames are brightened without substantial or without any brightening of a white spot in said noise reduced frame.

* * * * *

UNITED STATES PATENT AND TRADEMARK OFFICE
CERTIFICATE OF CORRECTION

PATENT NO. : 8,213,676 B2  
APPLICATION NO. : 11/642344  
DATED : July 3, 2012  
INVENTOR(S) : Bendall Page 1 of 1

It is certified that error appears in the above-identified patent and that said Letters Patent is hereby corrected as shown below:

In Fig. 4, Sheet 3 of 8, delete Tag "202" and insert Tag -- 102 --, therefor.

In Column 7, Line 14, delete "FIGS. 2" and insert -- FIG. 2 --, therefor.

In Column 9, Line 63, delete "($F_o$," and insert -- ($F_0$ --, therefor.

In Column 20, Line 33, in Claim 10, delete "(e)includes" and insert -- (e) includes --, therefor.

Signed and Sealed this
Sixth Day of November, 2012

David J. Kappos  
*Director of the United States Patent and Trademark Office*